US011790041B2

(12) United States Patent
Ha et al.

(10) Patent No.: US 11,790,041 B2
(45) Date of Patent: Oct. 17, 2023

(54) METHOD AND SYSTEM FOR REDUCING FALSE POSITIVES IN OBJECT DETECTION NEURAL NETWORKS CAUSED BY NOVEL OBJECTS

(71) Applicant: Midea Group Co., Ltd., Foshan (CN)

(72) Inventors: Thanh Huy Ha, Milpitas, CA (US); Yunke Tian, Santa Clara, CA (US); Mohamad Al Jazaery, San Jose, CA (US); Sathyanarayanan Muthusamy, Livermore, CA (US); Zhicai Ou, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 127 days.

(21) Appl. No.: 17/540,027

(22) Filed: Dec. 1, 2021

(65) Prior Publication Data
US 2023/0169150 A1   Jun. 1, 2023

(51) Int. Cl.
*G06F 18/214* (2023.01)
*G06T 7/194* (2017.01)
*G06V 10/22* (2022.01)
*G06F 18/25* (2023.01)

(52) U.S. Cl.
CPC ........ *G06F 18/2148* (2023.01); *G06F 18/251* (2023.01); *G06T 7/194* (2017.01); *G06V 10/22* (2022.01)

(58) Field of Classification Search
CPC ... G06F 18/2148; G06F 18/251; G06T 7/194; G06V 10/22
See application file for complete search history.

(56) References Cited

U.S. PATENT DOCUMENTS

| 2016/0006939 A1* | 1/2016 | Suzuki | H04N 23/741 |
| | | | 348/239 |
| 2019/0384304 A1* | 12/2019 | Towal | G06N 3/045 |
| 2022/0108454 A1* | 4/2022 | Tsai | G06T 7/174 |

FOREIGN PATENT DOCUMENTS

CN          112348765 A  *  2/2021    ............... G06T 3/60

OTHER PUBLICATIONS

Ryan et al, "Evaluation of augmented training datasets" (published in SPIE Defense + Commercial Sensing, vol. 11740, Apr. 2021) (Year: 2021).*

* cited by examiner

*Primary Examiner* — Casey L Kretzer
(74) *Attorney, Agent, or Firm* — Morgan, Lewis & Bockius LLP

(57) ABSTRACT

System and method for reducing false negatives in object detection, including: extracting an object of interest from a respective image in a first set of training data that includes in distribution (ID) data. For each of the object of interest extracted from the respective image in the first set of training data: fusing the object of interest with an image from a second set of data that does not include any objects of interest to form a fused image; adding the fused image to the training data; and using the training data to train a detection model for object detection.

18 Claims, 8 Drawing Sheets

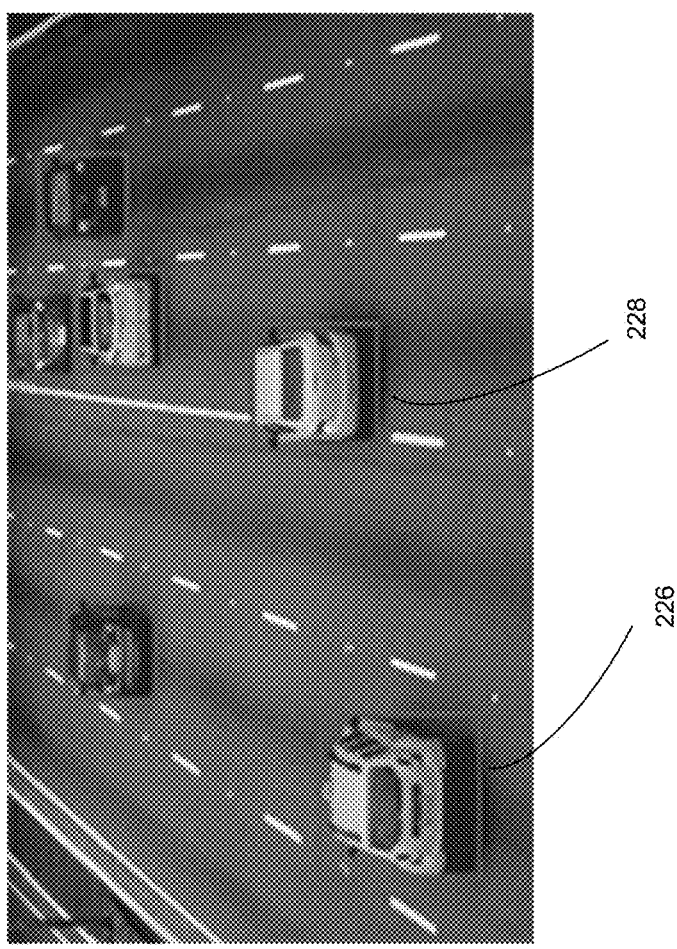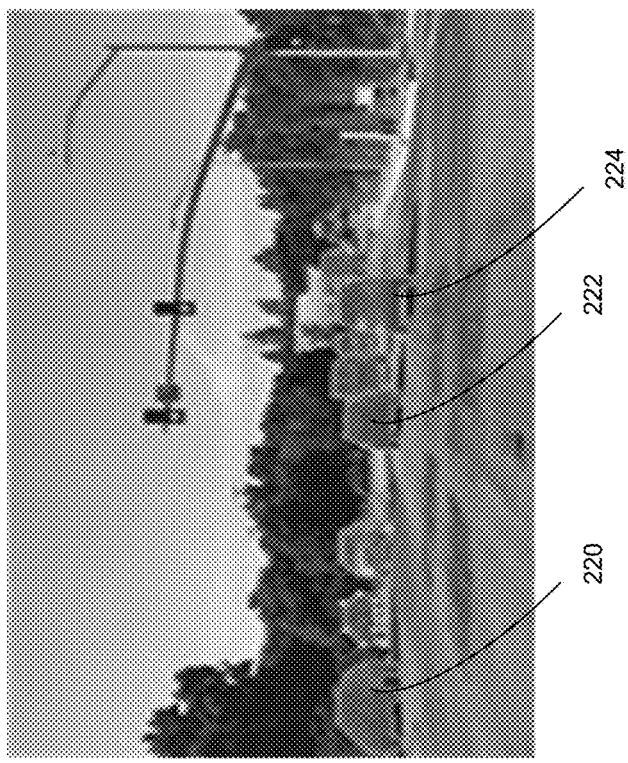
Figure 2B

400

Extract an object of interest from a respective image in a first set of training data that includes in distribution data 402 for each of the object of interest extracted from the respective image in the first set of training data:

Fuse the object of interest with an image from a second set of data that does not include any objects of interest to form a fused image 404

Add the fused image to the training data 406

Use the training data to train a detection model for object detection 408

Figure 4

Appliance 500

METHOD AND SYSTEM FOR REDUCING FALSE POSITIVES IN OBJECT DETECTION NEURAL NETWORKS CAUSED BY NOVEL OBJECTS

FIELD OF THE TECHNOLOGY

The present disclosure relates to the field of image processing, and in particular, to systems and methods for using improved image processing models to detect objects.

BACKGROUND OF THE TECHNOLOGY

Machines such as home appliances often have different predefined operational settings. For example, washing machines have multiple washer cycle settings with different water temperature, tumbling speed, spin speed, and so on. Microwave ovens have multiple cooking settings with different microwave power levels and cooking times. Selecting an appropriate setting is important for optimizing the performance of a machine. For example, selecting an appropriate washer cycle setting for a load of laundry is important in preventing damages to clothes (e.g., stretching, shrinking, or discoloration) and achieving optimal cleaning result. In some situations, a machine relies on image processing models to detect one or more objects (or object types) to be operated on (e.g., the type of clothes for washing machines, and the type of food items for microwave ovens), and automatically selects a machine operational setting based on the detected one or more objects (or object types).

Deep learning models such as convolutional neural networks (CNNs) and their variations are powerful image processing models, and are widely used for object detection tasks. However, detecting objects with both high precision (e.g., low false positive rates; precision is the ratio of true positive over the same of true positive and false positive) and high recall (e.g., low false negative rates; recall is the ratio of true positive over the sum of true positive and false negative) are challenging, sometimes due to the presence of classes of objects that are prone to misclassification such as "hard" negative samples that look very similar to positive samples under the view of the object detection/classification algorithms (false positives), or "hard" positive samples that look very similar to negative samples (false negatives).

SUMMARY

Improved methods and systems for reducing false positives caused by novel objects are highly desired.

The present disclosure describes a system and method for reducing false negatives in object detection, that includes extracting an object of interest from a respective frame of a first set of training data, for each of the object of interest segmented from the respective frame of the first set of training data: fusing the object of interest with an image from a second set of data that does not include any objects of interest to form a fused image; adding the fused image to a third set of training data; using the third set of training data and the first set of training data to train a detection model for object detection.

In some embodiments, in object classifications of an image, the image to be classified is a dominant portion of the image, and a determination is made whether the image contains a particular feature or type (e.g., whether the image contains a shoe). In contrast, in some embodiments, object detection includes detecting the object of interest (OOI) that occupies only a portion of the image, and the image includes background that does not include the OOI. In object detections, information about the location of the OOI within the image may also be provided, in addition to determining whether the image contains the particular feature or type (e.g., whether the image contains a shoe and a location of the shoe within the image).

Based on the methods and systems described herein, various issues associated with using image processing models to detect and classify objects that are prone to misclassification are addressed.

In one aspect, in accordance with some embodiments, a method is performed by a computing system that is communicably coupled with a home appliance and that is configured to control one or more functions of the home appliance.

In accordance with some embodiments, a computing system includes processors and memory storing instructions that, when executed, causes the one or more processors to perform the methods described herein. In accordance with some embodiments, an electronic device includes one or more processors, and memory storing one or more programs; the one or more programs are configured to be executed by the one or more processors and the one or more programs include instructions for performing or causing performance of the operations of any of the methods described herein. In accordance with some embodiments, a non-transitory computer readable storage medium has stored therein instructions, which, when executed by an electronic device, cause the device to perform or cause the performance of the operations of any of the methods described herein. In accordance with some embodiments, an electronic device includes: means for capturing images, and means for performing or causing the performance of the operations of any of the methods described herein.

Various additional advantages of the present application are apparent in light of the description below.

BRIEF DESCRIPTION OF THE DRAWINGS

The aforementioned features and advantages of the disclosed technology, as well as additional features and advantages thereof, will be more clearly understood hereinafter as a result of a detailed description of preferred embodiments when taken in conjunction with the drawings.

To describe the technical solutions in the embodiments of the presently disclosed technology or in the prior art more clearly, the following briefly introduces the accompanying drawings required for describing the embodiments or the prior art. Apparently, the accompanying drawings in the following description show merely some embodiments of the presently disclosed technology, and persons of ordinary skill in the art may still derive other drawings from these accompanying drawings without creative efforts.

FIG. 2B is a schematic of two different ways of annotating objects of interest, in accordance with some embodiments.

FIG. 4 is a flowchart diagram of a method for training an image processing model to reduce false negatives in object detection, in accordance with some embodiments.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

Figure 1A:
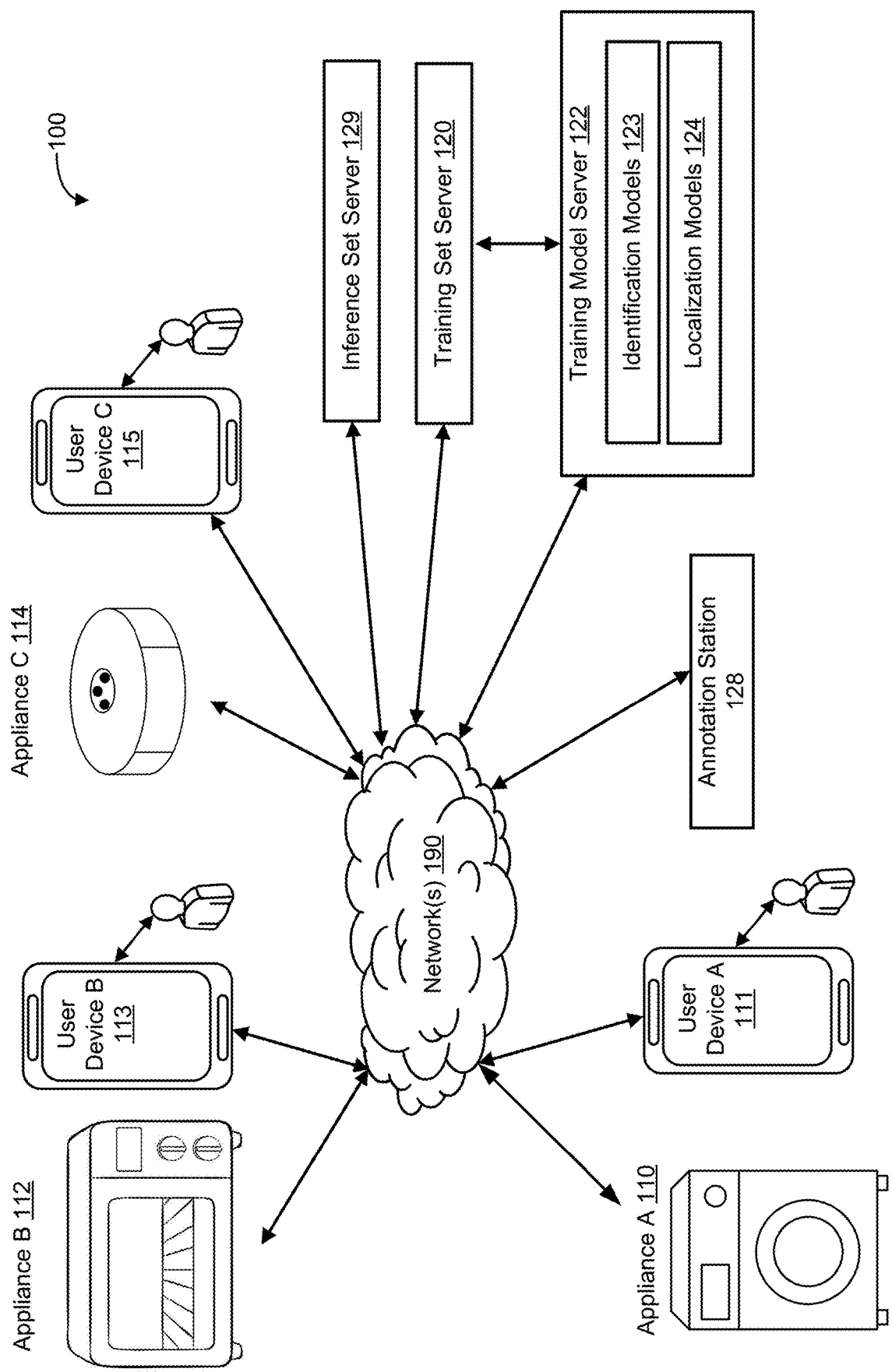
FIG. 1A shows a block diagram of an operation environment of a home appliance system, in accordance with some embodiments.

FIG. 1A shows a block diagram of an operation environment 100 of a home appliance system in accordance with some embodiments.

The operation environment 100 of a home appliance system includes one or more home appliances (e.g., appliance A 110, appliance B 112, and appliance C 114), connected to one or more servers (e.g., training set server 120 and training model server 122), and optionally to one or more user devices (e.g., user device A 111, user device B 113, and user device C 115) and/or annotation station(s) 128, via network 190 (e.g., a wide area network such as the Internet, or a local area network such as a smart home network).

In some embodiments the one or more home appliances (e.g., smart washing machines, smart microwave ovens, vacuum cleaning robots, etc.) are configured to collect raw sensor data (e.g., image, weight, temperature, thermal map data, etc.) and send the raw sensor data to corresponding user devices (e.g., smart phones, tablet devices, etc.), annotation station 128 (e.g., workstations and desktop computers), and/or training set server 120 (e.g., server provided by the manufacturer of the home appliances or third-party service providers for the manufacturer). In some embodiments, the one or more home appliances are also configured to receive control instructions from training model server 122 and/or a corresponding user device (e.g., appliance C 114 may receive control instructions from training model server 122 to traverse a vacuuming path, and/or avoid detected objects, and appliance A 110 may receive control instructions from user device A 111 to select a washer cycle).

In some embodiments, the one or more home appliances are trained prior to deployment in the field (e.g., no new training data set is added to the home appliance after a user purchases the home appliance and starts using the home appliance). Additional details regarding the one or more home appliances (e.g., appliance A 110, appliance B 112, and appliance C 114) is described in detail with reference to other parts of the present disclosure.

In some embodiments, the one or more user devices are configured to receive raw sensor data from a respective appliance (e.g., user device A 111, which corresponds to appliance A 110, is configured to receive raw sensor data from appliance A 110). In some embodiments, the one or more user devices are also configured to send annotated data to annotation station 128 and/or training set server 120. In some embodiments, the one or more user devices are configured to generate and send control instructions to the respective appliance (e.g., user device A 111 may send instructions to appliance A 110 to turn appliance A 110 on/off or to select a setting on appliance A 110). In some embodiments, the one or more user devices include, but is not limited to, a mobile phone, a tablet, or a computer device. In some embodiments, one or more user devices may correspond to one appliance (e.g., a computer and a mobile phone may both correspond to appliance A 110 (e.g., both are registered to be a control device for appliance A in an appliance setup process) such that appliance A 110 may send raw sensor data to either or both the computer and the mobile phone). In some embodiments, a user device corresponds to (e.g., shares data with and/or is in communication with) an appliance (e.g., user device A 111 corresponds to appliance A 110). For example, appliance A 110 may collect data (e.g., raw sensor data, such as images or temperature data) and send the collected data to user device A 111 so that the collected data may be annotated by a user on user device A 111.

In some embodiments, annotation station 128 is configured to receive collected data from the one or more appliances (e.g. appliances 110, and 112) so that the collected data may be annotated by specialized annotation personnel. In some embodiments, annotation station 128 is configured to receive annotated data from the one or more user devices (e.g., user devices 111, 113, and 115) for review, editing, and/or approval by the specialized annotation personnel. In some embodiments, when annotated data from the one or more user devices have been approved at annotation station 128, annotation station sends the approved data to training set server 120 to be included in the training corpus stored at the training set server. In some embodiments, annotation station 128 retrieves annotated data from server 120 for review, editing, and/or approval by the specialized annotation personnel. In some embodiments, annotation station 128 retrieves unannotated data from server 120 for annotation by the specialized annotation personnel. Sensor data that has been annotated and/or approved at annotation station 128 is returned to server 120 for inclusion in the training corpus.

In some embodiments, training set server 120 is configured to receive raw sensor data from the one or more home appliances (e.g. appliances 110, 112, and 114), and/or receive annotated data from the one or more user devices (e.g., user devices 111, 113, and 115). In some embodiments, training set server 120 is also configured to send raw and/or annotated data to annotation station 128, and receive annotated and/or approved annotated data from annotation station 128. Training set server 120 is configured to preprocess the annotated data, e.g., to group, divide, and correlate the training data, and index and store the training data, in accordance with the training models and training methods employed by training model server 122. Training set server 120 is configured to send selected training data (e.g., data that includes, corresponds to, or is based on annotated data that has been approved at annotation station 128) to training model server 122, in accordance with the particular training model requesting the training data.

In some embodiments, training model server 122 is configured to receive training data from training set server 120. Training model server is also optionally configured to send control instructions (e.g., machine instructions prepared according to the control protocols of a particular home appliance) and/or send text data (e.g., text messages) to the one or more appliances and/or user devices. Training model server 122 includes identification models 123 (e.g., for identifying and classifying objects), localization models 124 (e.g., for localizing and outlining objects), and other models. Identification models 123 are related to identifying objects being operated on by a home appliance (e.g., clothes, food items, etc.). Localization models 124 are related to locating items in a home appliance. For example, localization models 124 may be used to identify two pieces of chicken on a left side of the oven rack of the smart oven and four cookies on the right side of the oven rack of the smart oven, and outline each of them in an image captured by the smart oven. Training model server 122 trains identification model 123, localization models 124 and/or other models based on training data received from training set server 120. Once the training of identification models 123, localization models 124 and other models are sufficiently completed (e.g., achieved a threshold level of accuracies), the training set server 120 receives requests from home appliances to determine item identity/location in real-time based on sensor data captured by the home appliances. In some embodiments, the condition of the items determined by the training set server 120 is provided back to the requesting home appliances, such that each home appliance determines an appropriate action, e.g., changing an operation of the home appliance and/or alerting a user, based on the determined condition of the item.

In some embodiments, home appliances (e.g. appliances 110, 112, and 114), user devices (e.g., user devices 111, 113, and 115), annotation station 128, training set server 120, and training model server 122 are connected (e.g., sharing data with and/or in communication with) through one or more networks 190. One or more networks 190 may include wired and wireless networks and may be a local area network of a home or a wide area network (e.g., Internet).

Figure 1B:
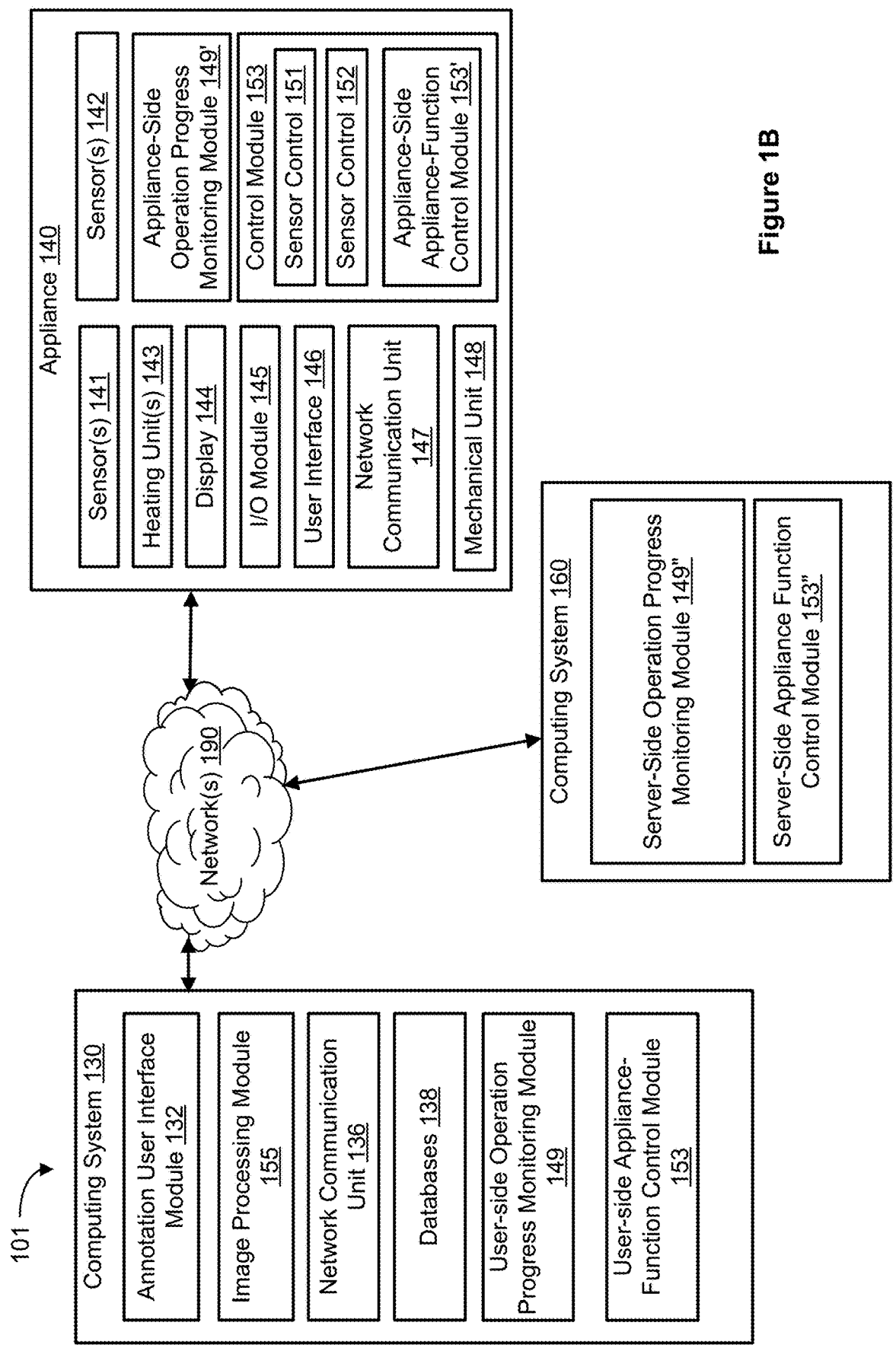
FIGS. 1B-1C show block diagrams of a home appliance system, in accordance with some embodiments.

FIG. 1B show block diagrams of a home appliance system 101 in accordance with some embodiments.

In some embodiments, as shown in FIG. 1B, home appliance system 101 includes home appliance 140 and computing system 130 that is implemented separately from home appliance 140. Home appliance 140 can serve as any of home appliances 110, 112, and 114 in FIG. 1A. In some embodiments, computing system 130 is in communication with home appliance 140 through one or more networks 190. In some embodiments, computing system 130 is implemented on a user device (e.g., in association with a user application for controlling and interacting with the home appliance). In some embodiments, computing system 130 and appliance 140 further communicate with computing system 160 to accomplish some of the functions on computing system 130 and appliance 140 in accordance with a client-server configuration. In some embodiments, computing system 160 is implemented on a server of a manufacturer of the home appliance (e.g., on training model server 122). In some embodiments, computing system 160 is implemented on a standalone computer (e.g., on a local server of a smart home).

Referring to FIG. 1B, computing system 130 includes one or more of annotation user interface module 132, imaging processing module 134, network communication unit 136, and one or more databases 138. which corresponds to user devices as described above with respect to FIG. 1A (e.g., user devices 111, 113, and 115). In some embodiments, computing system 130 further includes user-side operation progress monitoring module 149 and user-side appliance-function control module 153 to facilitate the machine operation progress monitoring and appliance control aspects of the home appliance system, in addition to the data collection and annotation aspect of the home appliance system as described herein.

In some embodiments, annotation user interface module 132 allows a user of computing system 130 to view and annotate raw sensor data received from a corresponding appliance 140 (e.g., appliance 110, 112, or 114). For example, a user may use an application on their user device (e.g., user device 111, 113, or 115) to view images and temperature data recorded by a corresponding appliance. The user may be able to add annotations and details to the collected data, described in further detail below with respect to FIG. 3, for example.

In some embodiments, image processing module 154 obtains images captured by imaging system of appliance 140 and processes the images for analysis. The functions of image processing module 154 and imaging system of appliance 140 are described below with respect to FIG. 2A, for example.

In some embodiments, databases 138 include a database of previously captured images of objects or images from other similar home appliance systems. In some embodiments, databases 138 includes ingredient databases that allow the computing system to provide nutritional information and recipes to the user, or clothes databases that allow the computing system to provide washing instructions to the user.

In some embodiments, computing system 130 includes an application that provides user-side functions, such as user-side operation progress monitoring and appliance-function control, in conjunction with computing system 160 and appliance 140.

In some embodiments, user-side progress monitoring module 149 is configured to determine progress of machine operation based on real-time sensor data captured by appliance 140.

In some embodiments, user-side appliance-function control module 153 is configured to provide a user interface for the user to directly control the appliance functions (e.g., turning the appliance on/off or setting an appliance parameter, etc.), and/or automatically generate control instructions based on the result of the progress monitoring. In some embodiments, the result of the progress monitoring is provided to the user-side appliance-function control module 153 from the user-side progress monitoring module 149. In some embodiments, the result of the progress monitoring is provided to the user-side appliance-function control module 153 from computing system 160. In some embodiments, the result of the progress monitoring is provided to the user-side appliance-function control module 153 from appliance 140.

In some embodiments, appliance 140 includes one or more first sensors (e.g., sensors 141), one or more heating units 143, display 144, I/O module 145, user interface 145, network communication unit 147, mechanical unit 148, control module 155, imaging system, and, optionally, appliance-side operation progress monitoring module 149'. Control module 155 includes an optional appliance-side appliance-function control unit 153'.

In some embodiments, the one or more first sensors 141 are configured to capture structured data, such as temperature, weight, and/or humidity. Structured data, as discussed herein, refers to quantitative or state data such as temperature, humidity, time, on/off, oven mode, etc. For example, the one or more first sensors 212 may be a temperature sensor (e.g., thermometer) or a humidity sensor, or weight sensor of the home appliance 140.

In some embodiments, the one or more heating units 143 are configured to heat at least a portion of the of the appliance (e.g., a heating coil configured to heat a cooking chamber of a smart oven).

In some embodiments, appliance 140 includes a display 144 that can provide information about appliance 140 to a user (e.g., the currently selected washer cycle). In some embodiments, display 144 may be integrated with I/O module 145 and user interface 146 to allow the user to input information into or read out information from appliance 140. In some embodiments, display 144 in conjunction with I/O module 145 and user interface 146 provides recommendations, alerts and nutritional information to the user and receive control instructions from the user (e.g., via hardware and/or software interfaces provided by appliance 140). In some embodiments, display 144 may be a touch screen display or a display that includes buttons. In some embodiments, display 144 may be a simple display with no touch-screen features (such as a conventional LED or LCD display) and user interface 146 may be hardware buttons or knobs that can be manually controlled. In some embodiments, user interface 146 optionally includes one or more of the following a display, a speaker, a keyboard, a touchscreen, a voice input-output interface etc.

Network communication unit 147 is analogous in function to network communication unit 137. Network communication unit 147 allows appliance 140 to communicate with computing system 130 and/or computing system 160 over one or more networks 190.

Mechanical unit 148 described herein refers to hardware and corresponding software and firmware components of appliance 140 that are configured to physically change the internal sensing (e.g., imaging), heating and/or layout configuration of the home appliance 140. For example, the one or more first sensors 141 may correspond to a mechanical unit such that the one or more sensors 141 are movable to scan a respective area inside appliance 140 (e.g., a motor may be configured to move a sensor across a predetermined area in order to capture data across the predetermined area). In some embodiments, the mechanical units 148 of the appliance 140 are operated in accordance with instructions from the appliance-function control unit of the home appliance system (e.g., appliance-side appliance-function control module 153', user-side appliance-function control module 153, and/or server-side appliance-function control module 153").

In some embodiments, appliance-side operation progress monitoring module 149' is configured to monitor operation progress of appliance 140. For example, if the appliance is a smart oven, appliance-side operation progress monitoring module 149' may, based on raw data recorded by the one or more first sensors 212 and/or the one or more second sensors 214, determine that the food has been cooked to medium doneness. In some embodiments, appliance-side operation progress monitoring module 149' is configured to determine cooking progress of food items based on real-time sensor data captured by sensors 141 and imaging system using food item location and outline determination models and food cooking progress level determination models that have been trained on computing system 160.

In some embodiments, imaging system includes one or more second sensors 142. The one or more second sensors 142 are configured to capture unstructured data. Examples of unstructured data include RGB images and thermal or infrared images. For example, if the appliance is a smart oven, the one or more second sensors 142 may be configured to capture or record still images or videos of the food present in a cooking compartment of an appliance. In some embodiments, if the appliance is a smart oven, imaging system includes a data storage system that stores the dimensions of the food cooking compartment, and the dimensions of the reference markers within the food cooking compartment, the distances between the camera and the various reference markers within the food cooking compartment, such that images taken by the cameras can be used to accurately determine the size and shape of the food items within the images. Thus, the imaging system eliminates the problems with conventional imaging systems which require the user's special attention to place a reference marker within the images or use images without the benefit of the size and location and orientation information of the items within the images. In some embodiments, the imaging system includes an image capture triggering system. For example, in some embodiments, the image capturing is triggered when the image capture triggering system detects that there has been a change in the field of view of the camera. For example, when the oven door is opened, the lighting condition in the oven will be changed, and the image capturing will be triggered in response to the opening of the oven door. In some embodiments, the image capturing is triggered when the food item starts to appear in the field of view of the camera. In some embodiments, the image capturing is triggered when then food item is completely inserted and the oven door is closed. In some embodiments, the image capture trigger system also instructs the camera to capture and store an image of the oven rack immediately before the oven door is opened, as the compartment baseline image of the interior of the oven. In some embodiments, the image capturing is triggered manually in response to a user's input, for example, after the user has inserted the food item into the food cooking compartment. Manual trigger is easier and less complicated to implement, and allows the user to purposefully capture images that best reflect the characteristics of the food item for ingredient recognition. In some embodiments, image processing module 154 obtains the images captured by the one or more second sensors 142, and preprocesses the images to remove the background from the images based on the compartment baseline image captured before the insertion of the food item. The compartment baseline image captures the exact condition of the food support platform in the food cooking compartment of the home appliance system, and provides an excellent filter for the images containing the food item to remove the background.

In some embodiments, control module 155 includes sensor control 151, sensor control 152, and appliance-side appliance-function control module 153'. Sensor control 151 is configured to control and adjust the one or more first sensors 141. For example, sensor control 151 may send instructions for the one or more first sensors 141 to record temperature data at 1-minute intervals. Sensor control 152 is configured to control and adjust the one or more second sensors 142. For example, sensor control 152 may send instructions for the one or more second sensors 142 to be moved along a first direction and to take capture a picture when the one or more second sensors 142 are at the starting position before being moved and at the final position after being moved.

Appliance-side appliance-function control module 153' is configured to control and adjust the various functions of appliance 140. For example, appliance-side appliance-function control module 153' may send instructions to heating units 143 to activate a first heating unit of the one or more heating units, or may send instructions to mechanical unit 148 to change its position. In some embodiments, appliance-side appliance-function control module 153' generates and send control instructions to various components of the appliance 140 based on preconfigured operation protocols (e.g., to implement the normal routine functions of the appliance 140). In some embodiments, appliance-side appliance-function control module 153' generates and send control instructions to various components of the appliance 140 based on real-time operation progress monitoring within the home appliance (e.g., to adjust functions of the appliance 140 automatically without user intervention based on preset reactions protocols or programs). In some embodiments, appliance-side appliance-function control module 153' generates and send control instructions to various components of the appliance 140 based on real-time user instructions received from user devices or via user interface 146 of appliance 140. In some embodiments, the result of the operation progress monitoring is provided to the appliance-side appliance-function control module 153' from the user-side operation progress monitoring module 149. In some embodiments, the result of the operation progress monitoring is provided to the appliance-side appliance-function control module 153' from computing system 160. In some embodiments, the result of the operation progress monitoring is provided to the appliance-side appliance-function control module 153' from appliance-side operation progress monitoring module 149'.

In some embodiments, computing system 160 includes server-side operation progress monitoring module 149" and server-side appliance-function control module 153". In some embodiments, the server-side operation progress monitoring module 149" employs identification models 123, localization models 124 and other models shown in FIG. 1A to determine object identity, location, outlines, and other conditions from real-time sensor data received from home appliance 140 (e.g., directly or through computing system 130). In some embodiments, computing system 160 is implemented by training model server 122 in FIGS. 1A, for example.

Network communication unit 136 allows computing system 130 to communicate with appliance 140 and/or computing system 160 over one or more networks 190. In some embodiments, a home appliance no longer communicates with training set server 120 and training model server 122 once the home appliance is deployed. Instead, after deployment (e.g., purchase, and/or subsequent use of the home appliance) the home appliance may often experience a distribution mismatch when the home appliance encounters data it has never seen during training. In some cases, a distribution mismatch can quantitative deviations and/or qualitative deviations. For example, quantitative deviations between the distribution of various classes of objects in the training data set and distribution of various objects in the real world sensed by the home appliance may include different percentages of images classes in the training data and the images collected by the home appliance after deployment. Qualitative deviations may involve new classes of objects that are not contained within the in distribution data (e.g., a home appliance that is trained to detect dogs and cats, encounters a wolf during deployment). Both quantitative and qualitative deviations may lead to detections of false positives.

For example, a vacuum cleaning robot may be trained, prior to deployment, to detect objects or obstacles to avoid while traversing a vacuuming path. The objects to avoid may be organized into classes of objects, or classes of interest (COI). Each COI is a class of objects, for which an object detection model is configured to detect and recognize. In the context of a vacuum cleaning robot, COIs can include, shoes, clothes, furniture, animals, trash cans, etc. An object of interest (OOI) is an object instance belonging to a particular COI. For example, a black shoe is an OOI of a COI of shoes. A training data set used to train a home appliance contains in distribution data (ID data) that refers to training data that contains objects from the classes of interest (COIs). In contrast to ID data, out of distribution data (OOD data) refer to image data that do not contain objects from any classes of interest (COIs). OOD data may be collected from any sources, such a various public image datasets, and/or images downloaded from the internet. No labels are needed for OOD data. In the context of a vacuum cleaning robot, OOD can include objects obtained from landscape, city, bikes, hands, faces, and or toys databases, etc.

Hard negative mining, is a method that can be used to mine hard false positives in ID data. For example, for ID data that includes a COI of shoes and a COI of furniture, an image containing a shoe may be a false positive for the COI of furniture. In the context of vacuum cleaning robots, a piece of trash (that a cleaning robot should have vacuumed) may be mischaracterized and mistakenly detected as a shoe, which the cleaning robot is pre-programmed to navigate around to avoid. In order words, the piece of trash is detected as a false positive of a shoe, which is a COI in the training set for the cleaning robot as a class of object for the cleaning robot to navigate around and avoid.

The functions of various systems within home appliance system 101 in FIG. 1B are merely illustrative. Other configurations and divisions of the functionalities are possible. Some functions of one sub-system can be implemented on another sub-system in various embodiments.

Figure 1C:
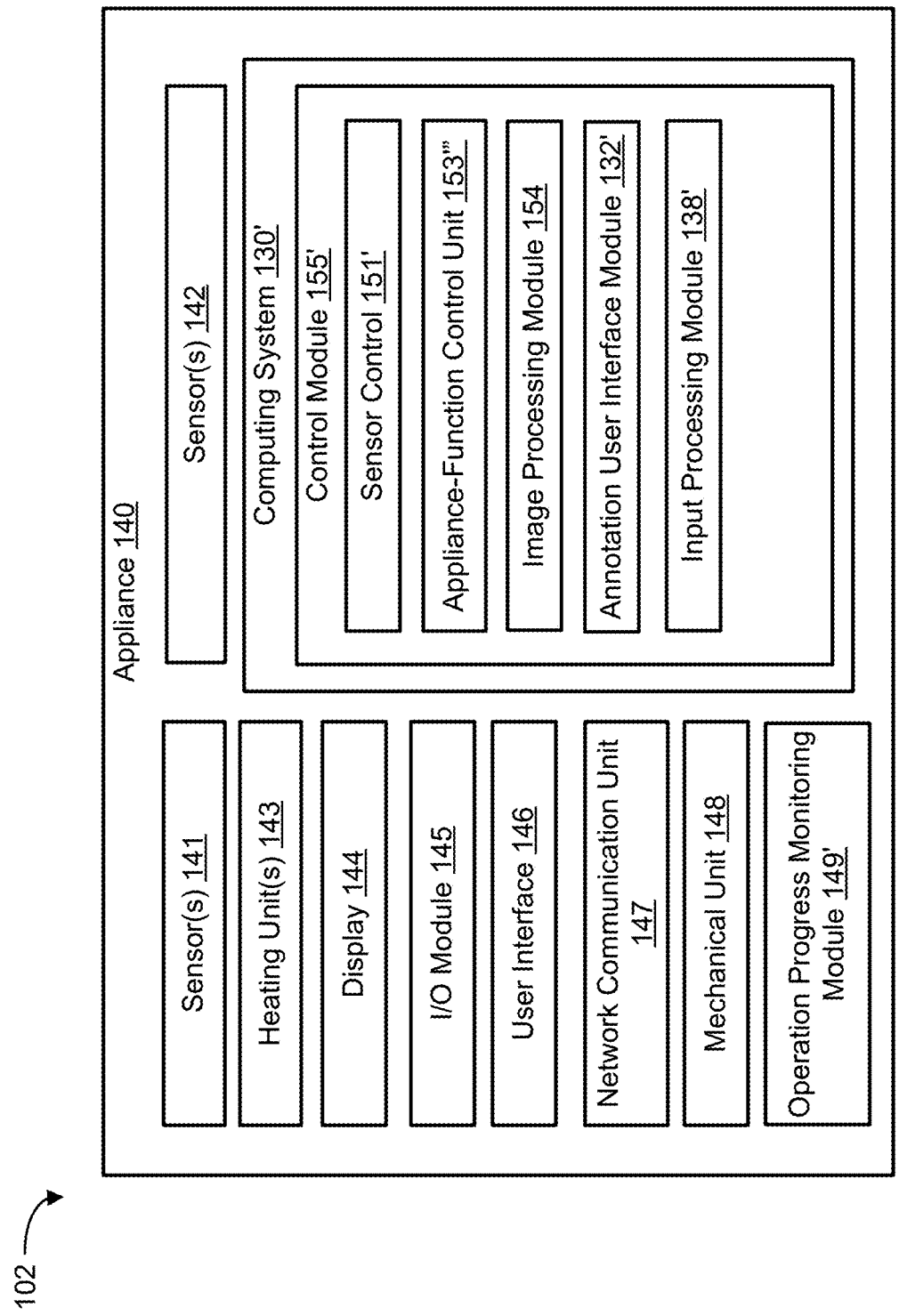

In some embodiments, as shown in FIG. 1C, home appliance system 101 includes a computing system 130' that is integrated with appliance 140'. In some embodiments, computing system 130' communicates with computing system 160' to accomplish some of the functions of appliance 140'. In some embodiments, appliance 140' optionally communicates with computing system 160 to outsource some of the functions of appliance 140'.

Referring to FIG. 1C, appliance 140' has a built-in computing system 130'. Appliance 140' includes sensors 141, heating unit(s) 143, display 144, I/O module 145, user interface 146, network communication unit 147, mechanical unit 148, and imaging system. These components of appliance 140' correspond to those in appliance 140 and have similar functionalities that will not be repeated herein for brevity.

In some embodiments, computing system 130' within appliance 140' includes control unit 155', sensor control 151', sensor control 152', appliance-side operation progress monitoring system 149', appliance-side appliance-function control module 153', image processing system 154', databases 138', and appliance-side annotation user interface module 132'. The functions of these components correspond to their respective counterparts with the same names in appliance 140 (e.g., sensor control 151' has the same function as sensor control 151) and will not be repeated for brevity. In some embodiments, annotation user interface module 132''' may allow a user to view and annotate raw user data on a user device, separate from appliance 140. In comparison, appliance-side annotation user interface module 132' may allow a user to view and annotate raw user data on display 144 of appliance 140' and/or annotate the operation progress levels in the images with voice input.

The above examples are provided merely for illustrative purposes. More details of the functions of the various components are set forth below with respect to other figures and illustrations. It can be understood that one or more components described herein may be used independently of other components.

Image processing may be directed for classification use cases and also for object detection use cases. The methods and systems disclosed herein relate to reducing false positives caused by novelty or outlier detection in the context of object detection use cases. In some embodiments, "novelty" refers to objects that are not part of, or supported by the classes of interest. In some embodiments, "outlier detection" refers to detection of false positives (e.g., an object that is not from the in distribution set of classes of interest (i.e., the object is out of distribution), but incorrectly determined as being in distribution).

An object detection model may detect false positives when it encounters novel objects in real life that the model has not previously encountered during training. The number of detected false positives can be reduced by taking a two-stage approach that includes connecting an object detection model with an outlier detection classifier. For example, in the first stage of the process, image processing zooms into a portion of the image containing the object of interest and crops that portion of the image. The cropped image is then classified in the second stage of the process to determine if the cropped image contains a particular feature or type of features (e.g., determining if the cropped image is "in distribution" or "out of distribution"). In other words, the detection model may serve as a region proposal network that analyzes an image and generates a map of the image where OOIs may be present. The false positives attributed to novel objects, as detected by the object detection model can be removed by the outlier detection classifier. Such a two-stage approach may not be suitable for low cost embedded systems.

In some embodiments, the model is trained in a training server, and the trained model is deployed in an embedded system. In some embodiments, the embedded system may be an appliance (e.g., a cleaning robot, a robot) containing a memory card that stores the trained model. The trained model then works in the embedded system to control operations of the appliance. In contrast to such two-stage approaches, the methods and systems described herein adopt a single model that only performs object detection, and ignores out of distribution images that is detected in the single model, but accounting for such out of distribution images by other methods (e.g., using OOD fusion described below, and using HNM to add one or more additional pseudo classes containing false positives to the training data).

OOD Fusion

By exposing the object detection model to OOD examples, the model can learn effective heuristics for detecting OOD inputs. For example, the mode can learn to be more conservative about characteristics of ID data of the relevant COI(s) (e.g., inlier) in order to better detect novel forms of outliers or anomalies. In some embodiments, outliers refers to novel objects that are incorrectly characterized as in distribution (e.g., a false positive) when that object is actually out of distribution (e.g., a negative). But simply adding OOD data to the training dataset and treating those added OOD data as negative samples may create an imbalance between a ratio of positive and negative samples in the training dataset. For example, a portion of an image that contains an OOI may be considered to be the positive sample, while the background for the same image containing the OOI may be considered to be the negative sample. In other words, the positive-negative balance may include an intra-sample balance between pixels that contain OOIs and the background pixels that do not contain OOIs. By adding OOD data, which may include an entire image that is devoid of any OOI, the ratio of positive and negative samples would be distorted, from the original balance in the training dataset because the number of negative samples increases without any corresponding increase in the number of positive samples. Distortion of the positive-negative sample balance may cause a big drop in object detection accuracy, and may cause the training process to diverge, in some cases.

Figure 2A:
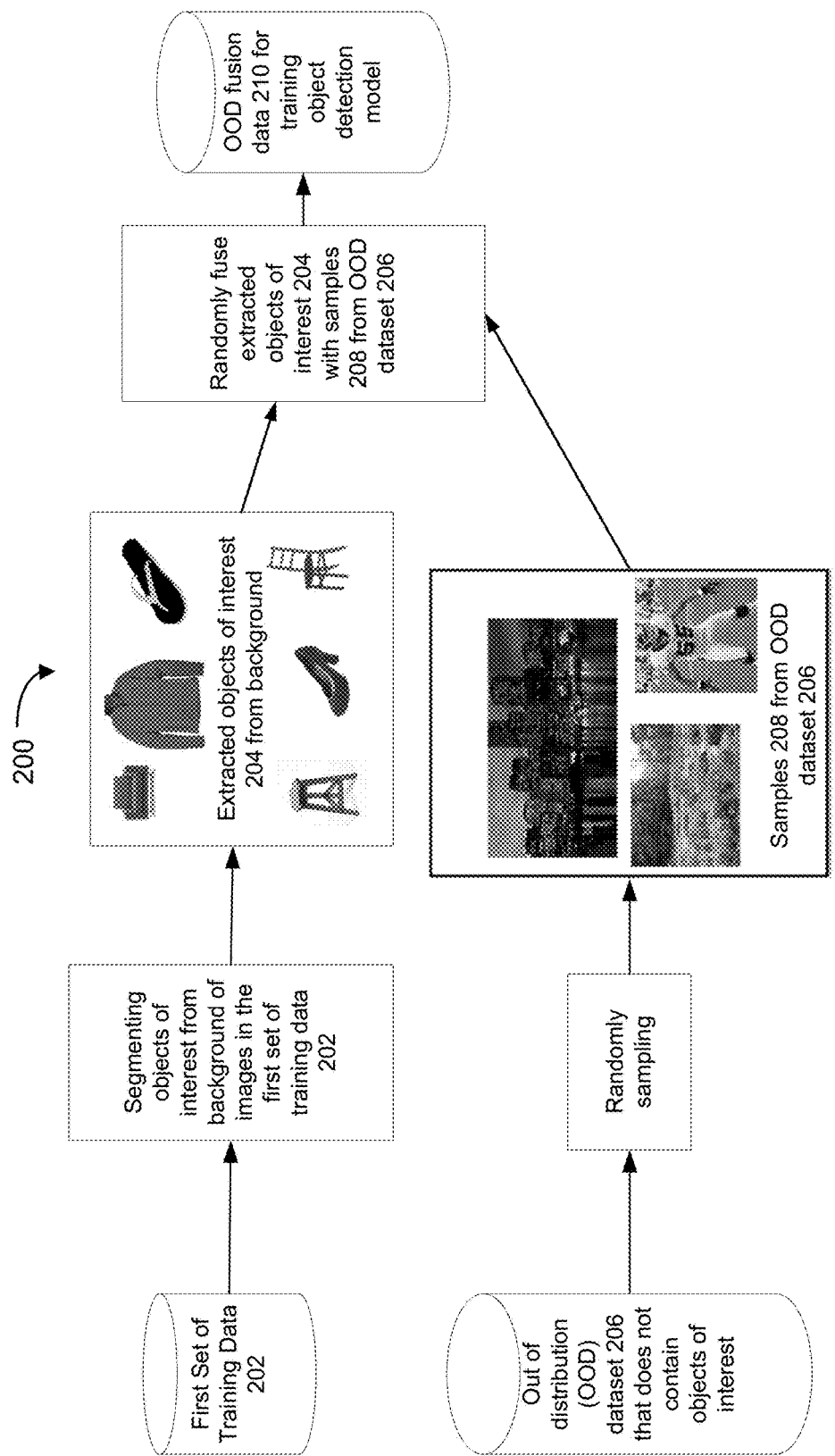
FIG. 2A is a schematic of a process for reducing a number of false positives detected by the object detection model, in accordance with some embodiments.

FIG. 2A is a schematic of a process 200 for reducing a number of false positives detected by the object detection model, in accordance with some embodiments. For convenience, the process 200 is described as being performed by a computing system of a vacuum cleaning robot (e.g., the computing system 130' of the appliance 140' in FIG. 1C.

The process 200 begins when a first set of training data 202 is provided to the object detection model. The first set of training data 202 includes in distribution data (ID data) of one or more COIs. In some embodiments, a single image contains multiple data with different data types. For example, an image may contain various clothes of different types. In such case, the image is divided into a plurality of sub-images, each with a single data type (e.g., clothes type), before being used in the first training session 304.

The process 200 includes segmenting and extracting one or more objects of interest (OOIs) 204 from a background of an image in the first set of training data 202.

FIG. 2B shows two different ways of annotating objects of interest, in accordance with some embodiments. In some embodiments, the OOIs in the first set of training data 202 are annotated with polygons 220, 222, and 224. Segmenting and fusing such annotated OOIs can be done simply by copying pixel values inside the polygons to the sample 208 from the OOD dataset 206. In some embodiments, the OOIs in the first set of training data 202 are annotated with bounding boxes 226 and 228. In some cases, segmentations tools are used to segment or extract the OOIs from within the bounding boxes (e.g., partitioning the image into one or more segments that includes one or more sets of pixels.

Table 1 below compares results between using the OOD fusion method and not using the OOD fusion method in two different types of object detection models. The object detection models can include EfficientDet and Yolo V5x. The OOD data included the use of about 500 thousand images of cities, landscape, indoor scenes, celebrities, bike data sets publicly available and downloaded from the internet. The original training set includes about 80 thousand images from 9 classes of interest (COIs), such as shoes, socks, chargers, etc. The results below are obtained when the two models are tested with five thousand images across 9 COIs, and 3,500 images of indoor novel objects.

TABLE 1

Testing results of OOD fusion method.

| | Without OOD Fusion | | With OOD Fusion | |
|---|---|---|---|---|
| Object detectors | F1 score for ID | False positive caused by novel objects | F1 score for ID | False positive caused by novel objects |
| Model 1 | 86.1% | 51% | 86.48% (+0.38%) | 21.3% (−29.7%) |
| Model 2 | 90.04% | 51.57% | 89.79% (−0.25%) | 26.83% (−24.74%) |

The method is very effective to both YoloV5 and EfficientDet neural networks and the OOD fusion method methods to reduce about 25% of false positives caused by novel objects.

As shown in FIG. 2A, an out of distribution (OOD) dataset 206 that does not contain any objects of interest is also provided to the object detection model. The process 200 includes randomly sampling the images in the OOD dataset 206 to yield a subset of samples 208 from the OOD dataset 206. The process 200 randomly fuses the extracted objects of interest 204 with the samples 208 from the OOD dataset 206 to form fused images 210. In some embodiments, the extracted object of interest (OOI) 204 is set as the foreground and one of the samples 208 from the OOD dataset 206 is set as the background of the fused image 210. Fusing the extracted OOI 204 with the samples 208 helps to keep the balance between positive samples and negative samples. The fused images 210 are added to the training dataset to reduce the amount of false negative detected by the object detection model. The training dataset that includes the fused images 210 is used to train an object detection model.

The number of fused images 210 to be added to each COIs may be determined as follows. In some embodiments, for a training dataset that includes C classes of interest COI in the in distribution data (ID), and where each $COI_i$ initially has $N_i$ instances, $M_i$ of fused images are additionally provided for each $COI_i$. When the number of instances in each COI is approximately equal (e.g., $N_i \approx N_j$; $i \neq j$), $M_i$ may be set as a fraction of $N_i$. For example, $x=M_i/N_i$, and x is between ⅓ to ½.

For each of the $M_i$ fused images, an extracted OOI 204 is randomly picked from a pool of extracted OOIs derived from the first set of training data 202. The process 200 also includes applying one or more augmentation operators on the selected OOI. The augmentation operators include one or more of rotation, flipping, color manipulation, image distortion, adjusting image brightness, magnifying an image, etc.). The process 200 then randomly selects a background image from the samples 208 derived from the out of distribution dataset 206. The process 200 also includes applying one or more augmentation operators on the randomly selected background image. The augmentation operators include one or more of rotation, flipping, and color manipulation, etc.), and may be different from the augmentation operator applied to the selected OOI. The process 200 also picks a random location on the augmented background image (e.g., the augmented sample 208) and fuses the augmented object to the augmented background image at the selected random location. In some embodiments, fusion includes copying pixels values from the augmented object (e.g., the OOIs within annotated polygon(s), after augmentation) to the augmented background image. In some embodiments, more complex fusion algorithms such as Poisson Solver is used to further reduce border artifacts between the background image and the OOIs.

Figure 3:
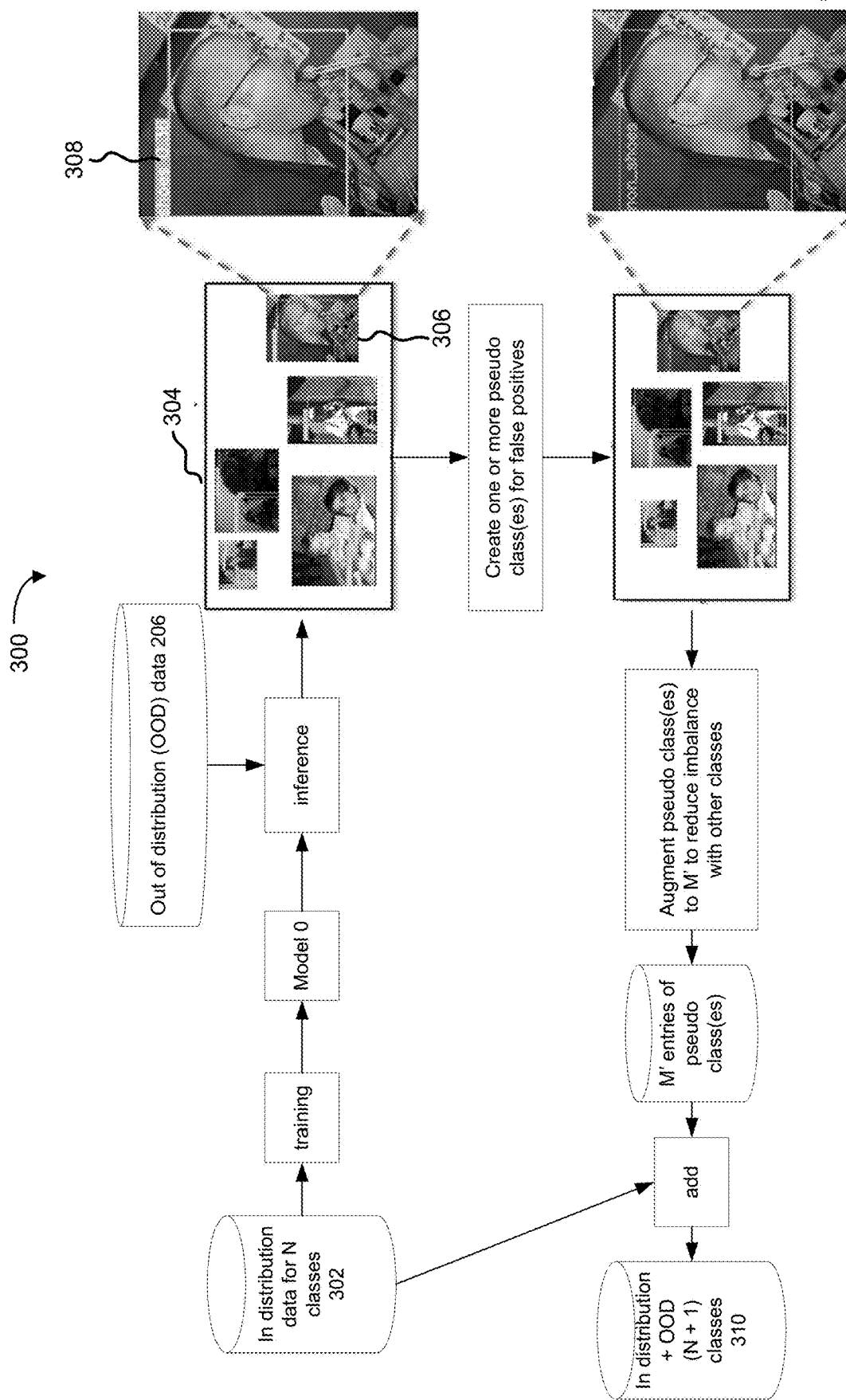
FIG. 3 is a schematic of a process for training an image processing model to reduce false negatives in object detection, in accordance with some embodiments.

Applying the HNM method on OOD data:

FIG. 3 is a schematic of a process for training an image processing model to reduce false negatives in object detection, in accordance with some embodiments. Instead of applying the HNM method to ID data for each $COI_i$, to mine for hard negatives, FIG. 3 shows an example of applying the HNM method to OOD data, in accordance with some embodiments.

A process 300 begins when a set of in distribution (ID) data 302 having N classes of COI is provided to train a model. This set of ID data 302 may also be referred to as training data. In some embodiments, there are 10 classes in the training data 302 and the ID data 302 is used in a training process to train a Model 0. After Model 0 is trained, the process 300 runs an inference of Model 0 on the OOD data 206. Thus, the box labeled "inference" depicted in FIG. 3 receives two inputs, one from the trained Model 0, and the second input from the OOD data 206. In some embodiments, fused OOD images, as described in the section above, can be added to the training data to reduce the occurrence of false positives, while not impacting a positive-negative imbalance in the training data. In some embodiments, hard negative mining (HNM) is used first and OOD fusion, which includes segmentation and fusion, is more complex than HNM, and is used only when the HNM results do not have enough false positives in the OOD data.

The computing system identifies from a plurality of inference results output by Model 0 and the OOD data, a first subset of inference results 304 that is a set of false positive results classifying a first set of images not containing at least one object of the first type into the first class for containing at least one object of the first type. The subset of inference results that is a set of false positive results can also be referred to as the pseudo class. For example, the first subset of inference results 304 is a set of false positives for the class "shoes," or a pseudo class of "non-shoes." The first subset of inference results 304 includes a false positive sample 306, which identifies a person's face as an image for a shoe. In some embodiments, the in distribution data 302 include images labeled with object types (e.g., images labeled as containing "shoes," "clothes," "furniture," etc.). For example, some images in ID data 302 are labeled as containing shoe types, and Model 0 is designed to detect whether an image contains "shoes." In some embodiments, the first subset of inference results 304 includes images that do not include any shoes but are nevertheless falsely classified by Model 0 as containing shoes.

In some embodiments, the false positive sample 306 includes a confidence score 308 (e.g., the false positive sample 306 has a confidence score 308 of 0.36). In some embodiments, confidence scores from the inference step are used as soft-labels of the pseudo class. The numerical values of the confidence scores provide useful additional information about the model (e.g., whether the model is very confident that an image is a true positive, whether the image is not so confident that the image is a true positive). In some embodiments, the confidence score is additionally used as a cut-off threshold (e.g., for a classification of "shoe" versus "non-shoe," a confidence score of, for example, less than 0.5 is considered non-shoe, and a confidence score of, for example, 0.5 or above is considered to be a shoe. In some embodiments, at this step in the process 300, more emphasis is placed on false positives that have confidence score larger than the cut-off threshold. Using the first subset of inference result 304, the process 300 includes creating one or more pseudo classes for the false positives from the first subset of inference results 304. For example, the first subset of inference results 304 is labeled as "non-shoes" and one pseudo class is created for "non-shoes." In some embodiments, the number of samples in the first subset set of inference results 304 may be different from (e.g., smaller than) the average number of samples in each of the N classes used contained in the ID data 302. For example, the first subset of inference results 304 may include approximately 10 thousand samples, while each of the N classes of ID data 302 may include about 40 thousand samples. In some embodiments, if the first subset of inference results 304 to exceeds an average number of samples in each class, the first subset of inference results 304 will be sampled to reduce the number of samples from the pseudo class to have balanced data. For example, false positives that have high confidence scores may be preferentially selected to be included.

The process 300 includes augmenting the number of samples in the created pseudo class to reduce imbalance (e.g., match, or mitigate by reducing a magnitude of the difference) in the number of samples, compared to other classes. For example, if the first subset of inference results 304 includes about 10 thousand samples, but the average number of samples in each of the N classes of ID data 302 is 40 thousand samples, then about 30 thousand samples are added by augmentation. In some embodiments, the computing system augments respective images in the first subset of inference results 304 by creating variations of the respective images through image distortion, flipping, adjusting image brightness, magnifying an image, and so on. Augmenting images increase the size of the newly created pseudo class and can better train an image processing model to perform object detection and classification. For example, the images in the first set of images are labeled as containing shoe types, the first image processing model is designed to detect whether an image contains "shoes," and the first subset of inference results 304, which does not contain shoes, has been falsely classified as containing shoes during the previous inference step. As a result, the images in the first subset of inference results 304 receives a special class label that is different from any previous shoes labels, such as "pseudo-shoes." This class label indicates that these images contain objects that are prone to misclassification (causing Model 0 to produce false positive results). Data having pseudo-false positive label (e.g., "non-shoes" or "pseudo-shoes") are classified into a separate class during both training and inference. Providing an extra class of pseudo-false positive objects helps to add granularity to the output of an image processing model, thus increasing the image processing model's precision while maintaining its recall.

After the number of samples in the pseudo class has been augment to include M' entries that reduces an imbalance to the other N classes of samples, the M' entries of the pseudo class is added to the ID data 302 to form a new dataset 310 that includes N+1 classes (i.e., N classes of the ID data 302, and one additional class from the newly added pseudo class that includes M' entries.) For example, if the original ID data set has ten COIs, and each COI includes 40 thousand samples, after HNM for one of the COIs (e.g., a shoe class), one additional pseudo-class named "non-shoes", which includes the false positives of shoe class in OOD data and the ID data. In some embodiments, HNM is exclusively applied to only the OOD 206.

The new dataset 310 can then be used to further train the image processing model (e.g., Model 0). FIG. 3 describes some embodiments in which a single pseudo class is added, but more than one pseudo class can be added simultaneously (e.g., the first subset of inference results 304 includes multiple subsets of inference results for multiple pseudo classes). For example, the image may contain multiple classes, and the HNM model is able to detect multiple classes of interest (COIs) present in a single image at the same time.

In some embodiments, the image processing models are stored and executed locally in the computing system of the appliance (e.g., vacuum cleaning robot). Alternatively, the process 300 and the associated the image processing models can be updated continuously via the network throughout the work life of the appliance.

In some embodiments, adding too many pseudo classes may impact a performance of the system. For example, Table 2 below shows results of applying HNM on OOD data. Table 2 shows an original ID data set having 10 classes and compares performance of the system when a single pseudo class is added and when 10 additional pseudo classes are added.

| Models | mAP ID | False positive (novelty) |
|---|---|---|
| Without any pseudo classes | 91.08% | 46.5% |
| With one pseudo class (e.g., non-shoe) | 91.65% | 26.9% |
| With ten pseudo classes | 90.72% | 45.7% |

Table 2 shows results of applying HNM on OOD data.

The ratio of false positive detection may include when too many pseudo classes are added. In other embodiments, the number of pseudo classes did not cause the performance of the system to decrease. mAP is the mean Average Precision (AP). The AP provides a measure of quality of the recall level for a single class classification, and is the area under the precision-recall curve. mAP is the mean of APs in a multi-class classification.

Combining OOD Fusion with the HNM Method

In some embodiments, HNM can be applied to each $COI_i$ where i=1, 2, . . . C. (e.g., sequentially or simultaneously), resulting in 2C classes (e.g., C original COIs, and C pseudo-classes). In some embodiments, when C is a large number (e.g., more than 10, more than 20, more than 50, more than 100), adding C more pseudo classes in the training data may negatively affect the accuracy of the detection model in ID and/or the robustness of the detection model with OOD data. For example, in some embodiments, accuracy refers to the ratio of the sum of true positives and true negative, over the sum of true positive, true negative, false positive, and false negative.

COIs that most negatively impact the performance of the model (e.g., generating the most number of false positives, generating a high ratio of false positive results) are selected such that pseudo classes of those COIs are added to the training data.

In such cases, a hybrid method that ranks the pseudo classes according to their number of instances in the OOD data is used, such that samples of C' (C'<<C) top pseudo classes are added into the training set. For example, the number of instances in the OOD data refers to the number of false positives found in the OOD data, for each class (e.g., shoe, the number of instances in the first set of inference results 304). In some examples, five COIs may have 1500, 4000, 6000, 200, and 1000 instances of false positives in each of the five COIs. Ranking these COIs by the number of instances, would result in the third COI (e.g. 6000 instances) being ranked first, the second COI (e.g., 4000 instances)

being rank second, and the first COI (e.g., 1500 instances) being ranked third. In some example where only the top three ranked pseudo classes are added to the training data, then only the third, second, and first COIs are added to the training data. Instances of false positive images from the fourth and fifth COIs are not added.

For OOD images that do not belong to the C' selected pseudo classes and are thus not added, such OOD images are added to the training data using the OOD fusion method described above. For example, in some implementations, one of OOD images identified as a false positive is used as a background image (after augmentation) and fused with a randomly selected object of interest (OOI) from the ID data at a random location on the OOD image. The fused image is then added to the training data. As a result, the training data may be a mixture of ID data and OOD data spanning a total of C+C' classes. In some embodiments, the fused OOD images are added to the class from which the OOI is obtained. Augmentation may be used to balance the number of instances across different classes, as described above. For example, if the instances of false positive images in one class is four thousand, but each COI in the in distribution data is 40 thousand, augmentation may be used to boost the number of instances in the pseudo class to reduce an imbalance between the number of instances in the pseudo class and the sample size of the COI (e.g., increasing the number of instances, using augmentation, to more than 10 thousand, to more than 20 thousand, to more than 30 thousand, to about 40 thousand samples). The methods and systems described herein help to maximize the exposure of the detection network with OOD data, emphasize hard negative samples in OOD data, while still helping to maintain, an original positive-negative balance of the ID data. The original positive-negative balance here means in each image there is at least one object to detect. In some embodiments, the "positive" in the positive-negative balance refers to the object to be detected in an image, and "negative" is the background in that image. After HNM and OOD fusion, each image in the training set will still contain at least one object to be detected, either as a pseudo class object or as an OOI.

The methods and systems described here can be used for supervised learning based object detection. The supervised learning can include using images containing annotations that are either polygons or bounding boxes. Such supervised learning based object detection is useful for obstacle detection for vacuum cleaning robots. Similarly, the methods and systems described herein can be applied to other object-detection based applications such as projects such as service robots, smart fridges, and smart ovens, etc.

The image processing models can include one or more image detection algorithms such as Convolutional Neural Network (CNN), Regional-based CNN (R-CNN), Fast and Faster R-CNN, Region-based Fully Convolutional Network (R-FCN), You-Only-Look-Once (YOLO), Single Shot Detector (SSD), and so on. Due to the high resource cost associated with training image processing models, in some embodiments, the image processing models are first trained in a remote computing system (e.g., the training model server 122 of FIG. 1A), and sent to the local computing system of the appliance via a network update.

In some embodiments, a single detection model that can detect and classify if the detected object belongs to one of the N classes of interest is used.

For convenience, the process 300 is described as being performed by a remote server (e.g., the training model server 122 of FIG. 1A). The process 300 outputs a trained image processing model to be stored and used by a local computing system (e.g., the computing system 130' of FIG. 1C). In an alternative embodiment, the process 300 is performed by a local computing system, and outputs a trained image processing model to be stored and used by the same local computing system. The process 300 is a generalized image processing model training process and is not specific to training image processing models for detecting shoes as described in FIG. 3.

The process 300 allows an image processing model to increase the precision of object detection and bi-class classification while maintaining the recall. In some embodiments, the process described in FIG. 3 updates the original model (e.g., Model 0) to become an updated model. Compared to the original model, the updated model can include one additional output node, a pseudo-class output. The pseudo-class output indicates that a data point is a "difficult sample" that is prone to misclassification, such as having caused the original model to give false positive results.

FIG. 4 is a flowchart diagram of a method 400 for reducing false negatives in object detection, in accordance with some embodiments. For convenience, the method 400 will be described as being performed by a computing system including one or more servers connected via a network. In some embodiments, the machine is a vacuum cleaning robot, a washing machine, an oven, a microwave oven, a refrigerator, or other home appliances.

As the first step, the computing system extracts an object of interest from a respective image in a first set of training data that includes in distribution data (402). For each of the object of interest extracted from the respective image in the first set of training data, the computing system fuses the object of interest with an image from a second set of data that does not include any objects of interest to form a fused image (404). The fused image is added to the training data (406). The computing system uses the training data to train a detection model for object detection (408). The detection model includes a first image processing model that is trained to classify a respective input image into a first class for images containing at least one object of a first type or a second class for images not containing at least one object of the first type. In some embodiments, the first image processing model is a bi-class classifier that classifies an image as either belonging to the first class or not belonging to the first case.

Figure 5:
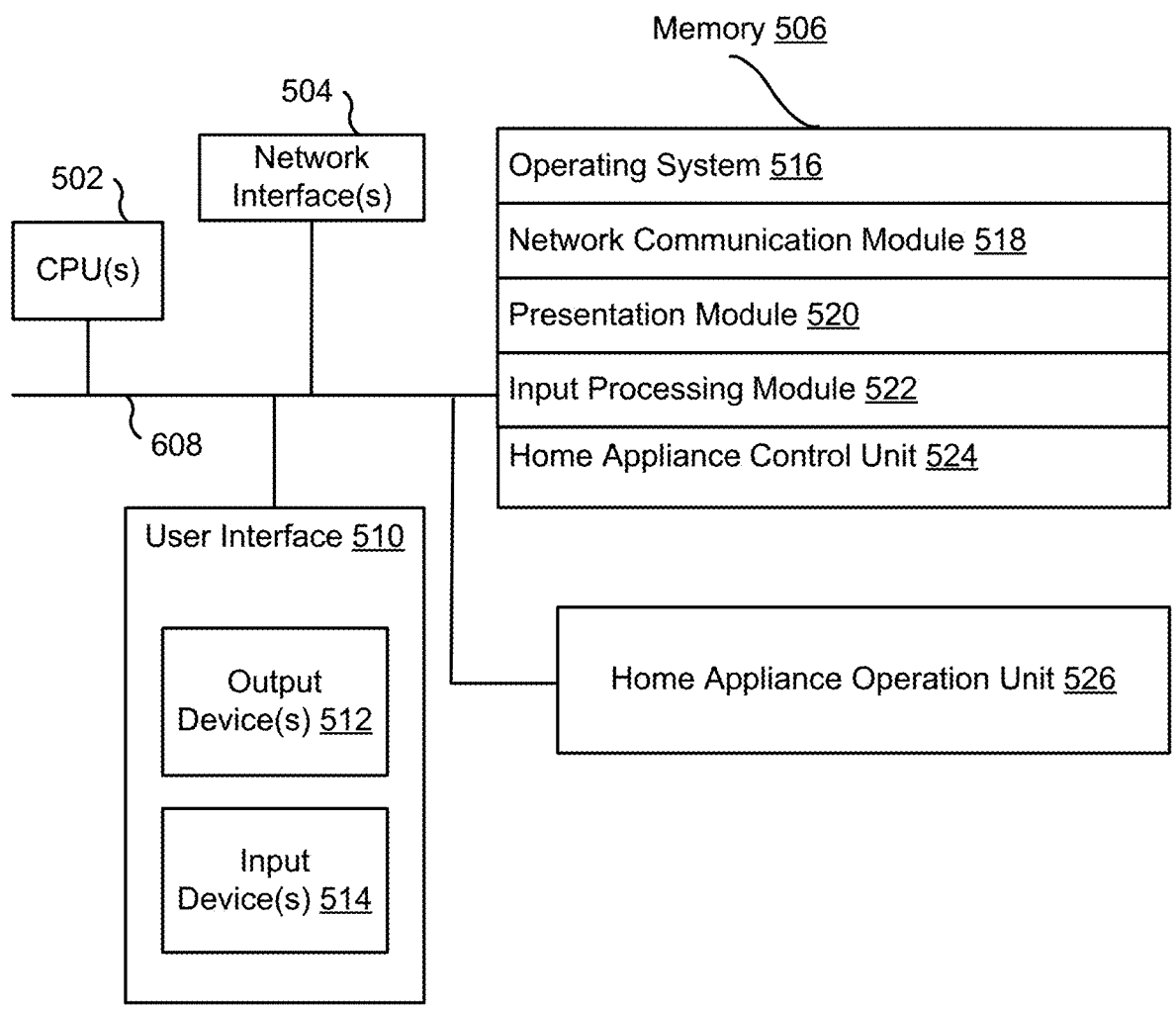
FIG. 5 is a diagram of an exemplary home appliance, in accordance with some embodiments.

FIG. 5 is a block diagram of an exemplary home appliance 500 in accordance with some embodiments. The home appliance 500 can serve as appliance 18, 112, 114, 140, 140', 200, 201, 202, 203, 204, for example, in various embodiments. The home appliance 500 includes one or more processing units (CPUs) 502, one or more network interfaces 504, memory 506, and one or more communication buses 608 for interconnecting these components (sometimes called a chipset). Home appliance 500 also includes a user interface 510. User interface 510 includes one or more output devices 512 that enable presentation of media content, including one or more speakers and/or one or more visual displays. User interface 510 also includes one or more input devices 514, including user interface components that facilitate user input such as a keyboard, a mouse, a voice-command input unit or microphone, a touch screen display, a touch-sensitive input pad, a gesture capturing camera, or other input buttons or controls. In some embodiments, home appliance 500 further includes sensors (e.g., sensors 141, 142), which senses operating environment information of the home appliance 500. Sensors include but are not limited to one or more heat sensors, light sensors, one or more cameras, humidity sensors, one or more motion sensors, one or more biological sensors (e.g., a galvanic skin resistance sensor, a pulse oximeter, and the like), weight sensors, spectrometers, and other sensors. Furthermore, the home appliance 500 includes home appliance operation unit 526 (e.g., heating means that are based on electricity, induction, gas, radiation, etc.). Memory 506 includes non-volatile memory, such as one or more magnetic disk storage devices, one or more optical disk storage devices, one or more flash memory devices, or one or more other non-volatile solid state storage devices. Memory 506, optionally, includes one or more storage devices remotely located from one or more processing units 502. Memory 506, or alternatively the non-volatile memory within memory 506, includes a non-transitory computer readable storage medium. In some implementations, memory 506, or the non-transitory computer readable storage medium of memory 506, stores the following programs, modules, and data structures, or a subset or superset thereof:

operating system 516 including procedures for handling various basic system services and for performing hardware dependent tasks;

network communication module 518 for connecting to external services via one or more network interfaces 504 (wired or wireless);

presentation module 520 for enabling presentation of information;

input processing module 522 for detecting one or more user inputs or interactions from one of the one or more input devices 514 and interpreting the detected input or interaction;

home appliance control unit 524, which controls the home appliance 500, including but not limited to modules of appliance 140 or 140' as forth herein.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

In some embodiments, a method of reducing false negatives in object detection includes at a computing device having one or more processors and memory: extracting an object of interest from a respective image in a first set of training data that includes in distribution (ID) data. For each of the object of interest extracted from the respective image in the first set of training data: fusing the object of interest with an image from a second set of data that does not include any objects of interest (e.g., the second set of data is out of distribution (OOD) data) to form a fused image; adding the fused image to the training data; and using the training data to train a detection model for object detection.

In some embodiments, fusing the object of interest with an image from a second set of data that does not include any objects of interest includes: augmenting the object of interest to form an augmented foreground image (e.g., by rotating, flipping, color manipulating the object of interest); augmenting the image from the second set of data to form an augmented background image; randomly selecting a location on the augmented background image; and adding the augmented foreground image to the augmented background image at the location.

In some embodiments, augmenting the foreground image includes one or more of rotating the object of interest, flipping the object of interest, or color manipulating the object of interest, and augmenting the background image comprises one or more of rotating the image from the second set of data, flipping the image from the second set of data, or color manipulating the image from the second set of data.

In some embodiments, the objects of interest from the first set of training data that includes the in distribute data belongs to a respective class of interest (COI) of the in distribution data; and the second set of data includes out-of-distribution (OOD) data. In some embodiments, the object of interest from the respective frame of the first set of training data is annotated as a polygon and fusing the object of interest with the image from the second set of data includes copying copy pixel values inside the polygon to the image from the second set of data.

In some embodiments, the method further includes prior to extracting an object of interest from a respective frame of a first set of training data, identifying false negative samples of at least one class of interest from the second set of data that does not include any objects of interest using a first image processing model, and generating at least one pseudo class using at least a portion of the false negative samples of the at least one class identified from the second set of data that does not include any objects of interest.

In some embodiments, a confidence score from an inference step of the first image processing model is used as a soft label for the at least one pseudo class. In some embodiments, the method further includes adding the at least one pseudo class to the training data to train the detection model for object detection. In some embodiments, the method further includes generating additional fused images from one or more pseudo classes distinct from the at least one pseudo class added to train the detection model, and adding the additional fused images to the training data to train the detection model for object detection.

In some embodiments, the method further includes maintaining a positive-negative balance in the training data, wherein the positive-negative balance comprises a ratio of a first portion of an image containing an object of interest and a second portion of the image not containing the object of interest.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 506, optionally, stores a subset of the modules and data structures identified above. Furthermore, memory 506, optionally, stores additional modules and data structures not described above.

What is claimed is:

1. A method of reducing false negatives in object detection, comprising:
at a computing device having one or more processors and memory:
extracting an object of interest from a respective image in a first set of training data that includes in distribution (ID) data;
for the object of interest extracted from the respective image in the first set of training data:
fusing the object of interest with an image from a second set of data that does not include any objects of interest to form a fused image, including:
augmenting the object of interest to form an augmented foreground image;
augmenting the image from the second set of data to form an augmented background image;
randomly selecting a location on the augmented background image; and
adding the augmented foreground image to the augmented background image at the location;
adding the fused image to the training data; and
using the training data to train a detection model for object detection.

2. The method of claim 1, wherein augmenting the object of interest to form the augmented foreground image comprises one or more of rotating the object of interest, flipping the object of interest, or color manipulating the object of interest, and augmenting the image from the second set of data to form the augmented background image comprises one or more of rotating the image from the second set of data, flipping the image from the second set of data, or color manipulating the image from the second set of data.

3. The method of claim 1, wherein the object of interest from the first set of training data that includes the in distribution data belongs to a respective class of interest (COI) of the in distribution data, and the second set of data comprises out-of-distribution (OOD) data.

4. The method of claim 1, wherein the object of interest from a respective frame of the first set of training data is annotated as a polygon and fusing the object of interest with the image from the second set of data comprises copying pixel values inside the polygon to the image from the second set of data.

5. The method of claim 1, further comprising:
prior to extracting an object of interest from a respective frame of a first set of training data, identifying false negative samples of at least one class of interest from the second set of data that does not include any objects of interest using a first image processing model; and
generating at least one pseudo class using at least a portion of the false negative samples of the at least one class identified from the second set of data that does not include any objects of interest.

6. The method of claim 5, wherein a confidence score from an inference step of the first image processing model is used as a soft label for the at least one pseudo class.

7. The method of claim 5, further comprising: adding the at least one pseudo class to the training data to train the detection model for object detection.

8. The method of claim 7, further comprising:
generating additional fused images from one or more pseudo classes distinct from the at least one pseudo class added to train the detection model; and
adding the additional fused images to the training data to train the detection model for object detection.

9. The method of claim 1, further comprising maintaining a positive-negative balance in the training data, wherein the positive-negative balance comprises a ratio of a first portion of an image containing an object of interest and a second portion of the image not containing the object of interest.

10. A computing device, comprising:
one or more processors; and
memory storing instructions, the instructions, when executed by the one or more processors, cause the processors to perform operations comprising:
extracting an object of interest from a respective image in a first set of training data that includes in distribution (ID) data;
for the object of interest extracted from the respective image in the first set of training data:
fusing the object of interest with an image from a second set of data that does not include any objects of interest to form a fused image, including:
augmenting the object of interest to form an augmented foreground image;
augmenting the image from the second set of data to form an augmented background image;
randomly selecting a location on the augmented background image; and
adding the augmented foreground image to the augmented background image at the location;
adding the fused image to the training data; and
using the training data to train a detection model for object detection.

11. The computing device of claim 10, wherein the operations include:
prior to extracting an object of interest from a respective frame of a first set of training data, identifying false negative samples of at least one class of interest from the second set of data that does not include any objects of interest using a first image processing model; and
generating at least one pseudo class using at least a portion of the false negative samples of the at least one class identified from the second set of data that does not include any objects of interest.

12. The computing device of claim 11, wherein a confidence score from an inference step of the first image processing model is used as a soft label for the at least one pseudo class.

13. The computing device of claim 10, wherein the operations include:
maintaining a positive-negative balance in the training data, wherein the positive-negative balance comprises a ratio of a first portion of an image containing an object of interest and a second portion of the image not containing the object of interest.

14. A non-transitory computer-readable storage medium storing instructions, the instructions, when executed by one or more processors, cause the processors to perform operations comprising:
extracting an object of interest from a respective image in a first set of training data that includes in distribution (ID) data;
for the object of interest extracted from the respective image in the first set of training data:

fusing the object of interest with an image from a second set of data that does not include any objects of interest to form a fused image, including:
  augmenting the object of interest to form an augmented foreground image;
  augmenting the image from the second set of data to form an augmented background image;
  randomly selecting a location on the augmented background image; and
  adding the augmented foreground image to the augmented background image at the location;
adding the fused image to the training data; and
using the training data to train a detection model for object detection.

15. The non-transitory computer-readable storage medium of claim 14, wherein the operations include:
  fusing the object of interest with an image from a second set of data that does not include any objects of interest includes:
    augmenting the object of interest to form an augmented foreground image;
    augmenting the image from the second set of data to form an augmented background image;
    randomly selecting a location on the augmented background image; and
    adding the augmented foreground image to the augmented background image at the location.

16. The non-transitory computer-readable storage medium of claim 14, wherein the operations include:
  prior to extracting an object of interest from a respective frame of a first set of training data, identifying false negative samples of at least one class of interest from the second set of data that does not include any objects of interest using a first image processing model; and
  generating at least one pseudo class using at least a portion of the false negative samples of the at least one class identified from the second set of data that does not include any objects of interest.

17. The non-transitory computer-readable storage medium of claim 16, wherein a confidence score from an inference step of the first image processing model is used as a soft label for the at least one pseudo class.

18. The non-transitory computer-readable storage medium of claim 14, wherein the operations include:
  maintaining a positive-negative balance in the training data, wherein the positive-negative balance comprises a ratio of a first portion of an image containing an object of interest and a second portion of the image not containing the object of interest.

* * * * *